(12) United States Patent
Hanyu

(10) Patent No.: US 6,648,403 B2  
(45) Date of Patent: Nov. 18, 2003

(54) BODY UPPER STRUCTURE FOR VEHICLE

(75) Inventor: Atsushi Hanyu, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/173,166

(22) Filed: Jun. 18, 2002

(65) Prior Publication Data

US 2002/0190543 A1 Dec. 19, 2002

(30) Foreign Application Priority Data

Jun. 19, 2001 (JP) .................................. P2001-184594

(51) Int. Cl.⁷ .............................................. B62D 27/04
(52) U.S. Cl. ..................... 296/203.03; 296/188; 296/29
(58) Field of Search ........................... 296/203.03, 187, 296/188, 189, 193, 202, 29

(56) References Cited

U.S. PATENT DOCUMENTS

| | | | | |
|---|---|---|---|---|
| 6,050,631 A | * | 4/2000 | Suzuki et al. ............... | 296/189 |
| 6,126,231 A | * | 10/2000 | Suzuki et al. ............... | 296/189 |
| 6,179,370 B1 | * | 1/2001 | Takeuchi .................... | 296/188 |
| 6,247,287 B1 | * | 6/2001 | Takabatake ................ | 296/188 |
| 6,279,990 B1 | * | 8/2001 | Miyasaka et al. ......... | 296/203.03 |
| 6,328,376 B2 | * | 12/2001 | Son ........................ | 296/203.03 |
| 6,357,812 B1 | * | 3/2002 | Adachi et al. ............... | 296/188 |
| 6,390,538 B1 | * | 5/2002 | Hashimoto et al. ......... | 296/189 |
| 6,419,302 B2 | * | 7/2002 | Mikuni ........................ | 296/187 |
| 6,474,724 B2 | * | 11/2002 | Lemmon et al. ............ | 296/189 |
| 6,478,367 B2 | * | 11/2002 | Ishikawa ............... | 296/203.03 |
| 2002/0089205 A1 | * | 7/2002 | Adachi et al. ............... | 296/189 |

FOREIGN PATENT DOCUMENTS

| | | | |
|---|---|---|---|
| JP | 10-203279 | * | 1/1997 |
| JP | 10-16665 | * | 1/1998 |
| JP | 11-105637 | * | 4/1999 |
| JP | 2000-33883 | * | 2/2000 |
| JP | 2000-313353 | | 11/2000 |

* cited by examiner

Primary Examiner—D. Glenn Dayoan  
Assistant Examiner—H Gutman  
(74) Attorney, Agent, or Firm—McDermott, Will & Emery

(57) ABSTRACT

A body upper structure includes a roof side-rail (1) and a center pillar (9) having a pillar outer member (10). The roof side-rail (1) has a vertical rib (7) bridging between an upper wall and a lower wall. The pillar outer member (10) has a plurality of vertical ribs (13). In operation, at a vehicle collision, the vertical rib (7) of the roof side-rail (1) acts to receive a downward bending load, in the form of a buckling load in the up-and-down direction while exhibiting a high resistance against the bending load. Subsequently, the downward load is accepted by a shoulder part (12) and the vertical ribs (13) of the pillar outer member (10), in the axial direction of the center pillar (9) and transmitted in dispersion to the whole center pillar (9) effectively.

8 Claims, 5 Drawing Sheets

BODY UPPER STRUCTURE FOR VEHICLE

CROSS-REFERENCES TO RELATED APPLICATIONS

Japanese Patent Application No. 2001-284594 is expressly incorporated by reference in its entirely.

BACKGROUND OF THE INVENTION

1. Field of the Invention

The present invention relates to a body upper structure for a vehicle. Particularly, it relates to a structure around a joint between a roof side-rail and a center pillar for a vehicle. In the vehicle, the roof side-rail forms one fore-and-aft directional framework member on one side of the roof, while the center pillar forms one up-and-down directional framework member on one side of the vehicle body.

2. Description of Related Art

Japanese Patent Application Laid-open No. 2000-313353 discloses a body upper structure for vehicle. In this structure, an engagement rib is formed on a connecting part between a center-pillar outer member and the roof side-rail. While, an engagement recess is formed on another connecting part between a center-pillar inner member and the roof side-rail. In assembling, by engaging and welding the engagement rib with the engagement recess, the roof side-rail and the center pillar are integrated into one body.

Now, it is known that a downward load is applied on the roof side-rail when the vehicle has an "offset" front collision or when the roof collapses. On the other hand, when the vehicle has a side collision, the center pillar is subjected to a load in a direction to thrust up the roof side-rail.

SUMMARY OF THE INVENTION

The above-mentioned body upper structure has the roof side-rail and the center pillar formed into one body; nevertheless there still remains a possibility that when the vehicle has the above collisions, the roof side-rail or the center pillar is locally and greatly deformed since the structure does not take measures to effectively transmit a collision load from the roof side-rail to the center pillar, and vice versa.

Under the above circumstance, it is an object of the present invention to provide a body upper structure for a vehicle, which is superior in transmitting a load from the roof side-rail to the center pillar, and vice versa, thereby reducing a local deformation in the roof side-rail or the center pillar at the vehicle collision or at the collapse of the roof.

According to the invention, the above-mentioned object is accomplished by a body upper structure for a vehicle, comprising:

a roof side-rail which is formed to have a closed cross section and also provided with a vertical rib bridging between an upper wall and a lower wall both forming the roof side-rail; and a center pillar united with the roof side-rail, the center pillar having a pillar outer member and a shoulder part formed on an upper end of the pillar outer member so as to fit a successive corner defined between lower and outer walls forming the roof side-rail thereby to support the roof side-rail;

wherein the pillar outer member is provided, on an interior side thereof, with a plurality of vertical ribs at an interval in a fore-and-aft direction of the vehicle, the vertical ribs extending from a base of the shoulder part downward while respective upper ends of the vertical ribs are abutting on the lower wall of the roof side-rail; and wherein the vertical ribs are formed to project inwardly in a width direction of vehicle, up to a position where, in view along an up-and-down direction of vehicle, the upper ends of the vertical ribs substantially intersect with the vertical rib of the roof side-rail.

DESCRIPTION OF THE PREFERRED EMBODIMENT

Embodiments of the present invention will be described with reference to accompanying drawings.

Figure 1:
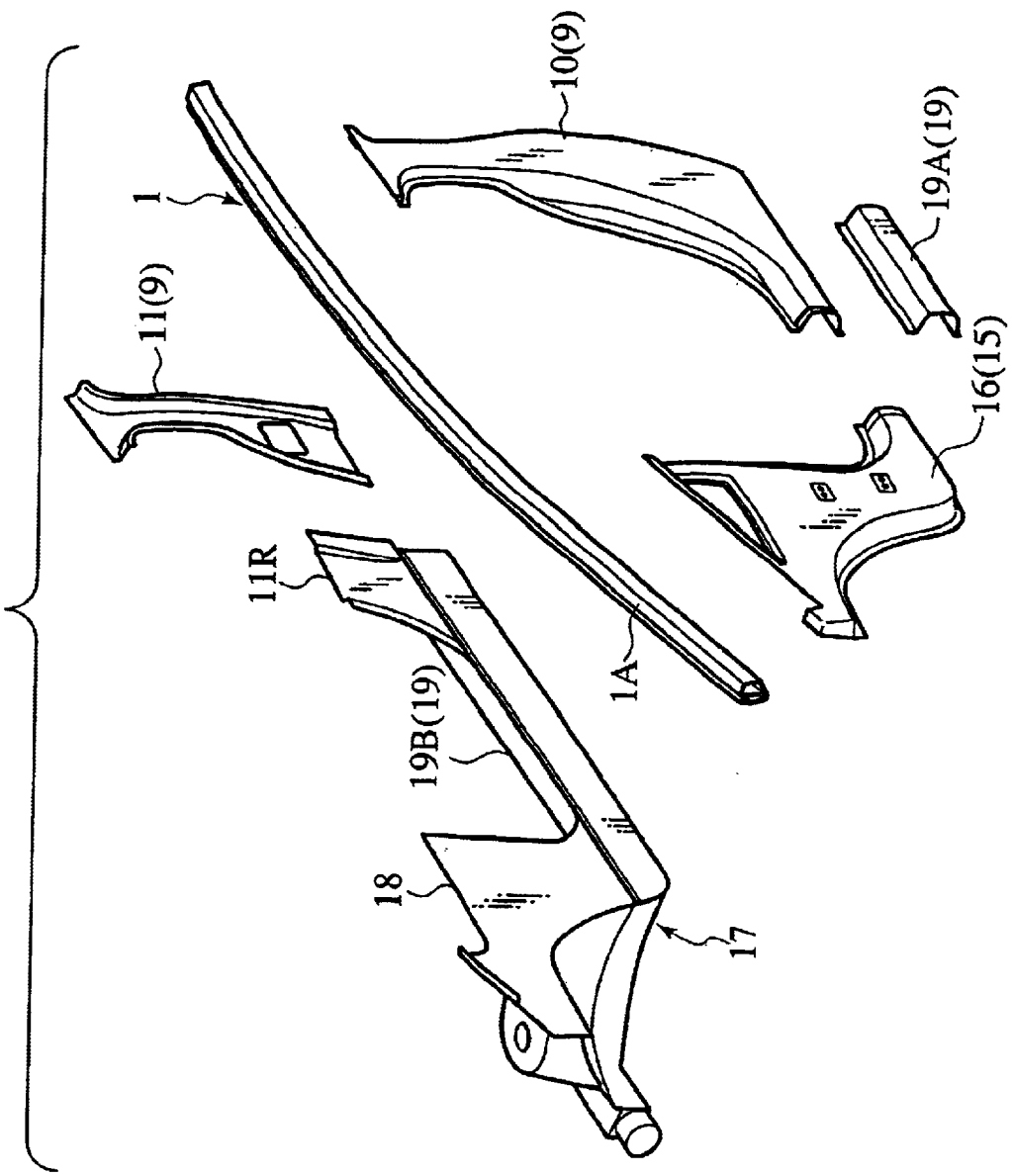
FIG. 1 is an exploded perspective view showing a body upper structure for vehicle in accordance with one embodiment of the present invention.
Figure 2:
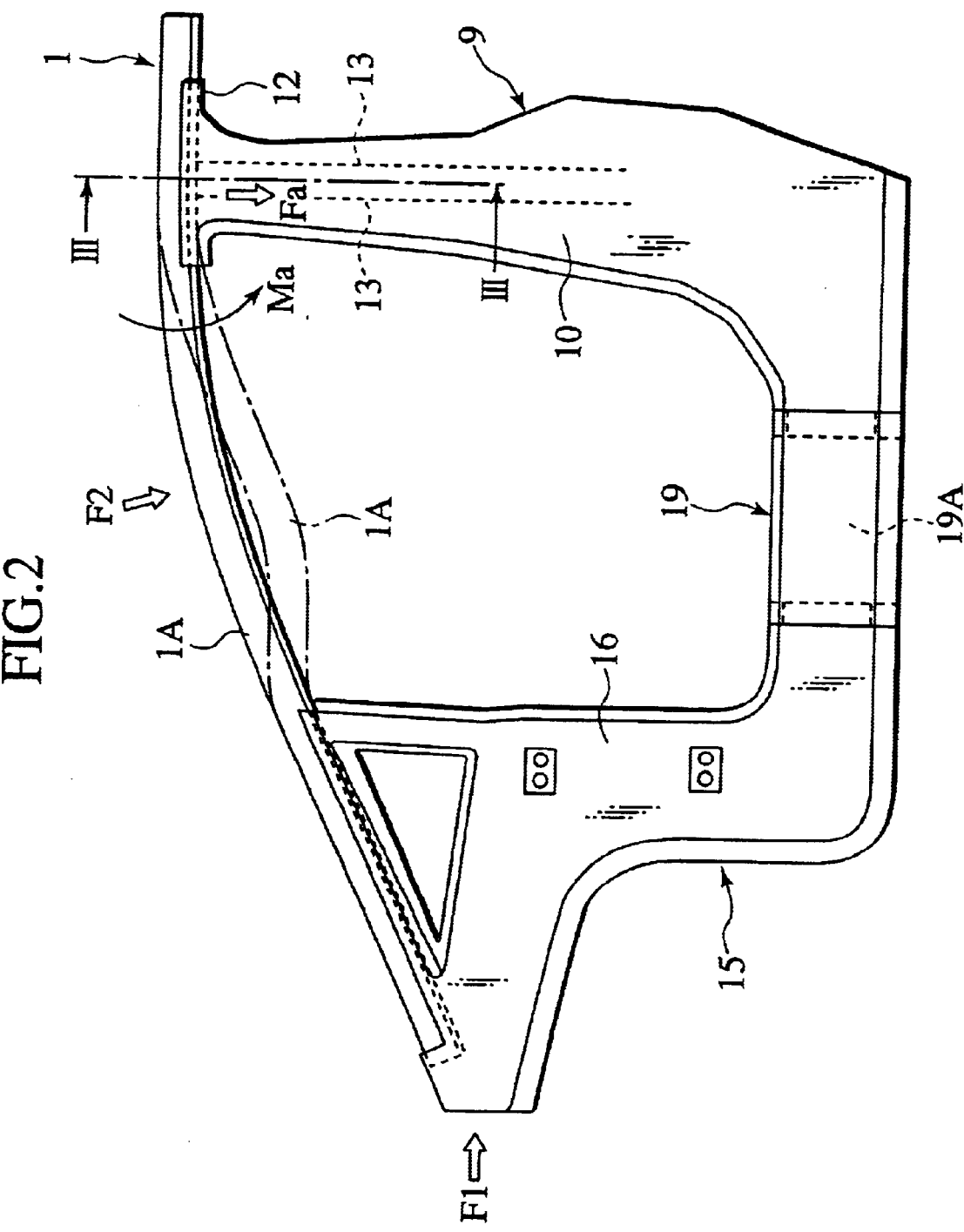
FIG. 2 is a side view of the body upper structure of the embodiment, showing its assembled state.
Figure 3:
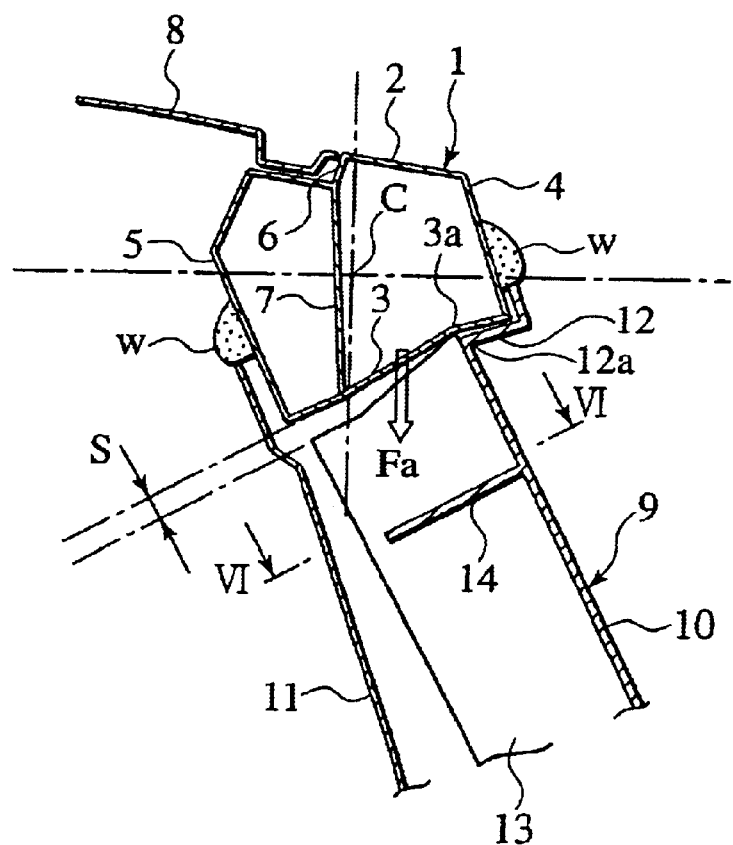
FIG. 3 is a sectional view taken along a line III–III of FIG. 2.

Throughout FIGS. 1 to 4, reference numeral 1 designates a roof side-rail that forms a fore-and-aft directional framework member on one side of a roof. As shown in FIG. 3 the roof side-rail 1 is formed by an upper wall 2, a lower wall 3, an outer wall 4 and an inner wall 5, providing a closed section.

The upper wall 2 of the roof side-rail 1 is provided with a step part 6 which is to be welded to a side edge of a roof panel 8. In the closed section, the roof side-wall 1 has a generally perpendicular (vertical) rib 7 formed to bridge between a corner of the step part 6 and the lower wall 3.

According to the embodiments, the so-constructed roof side-rail 1 is integrally produced by extruding a specified light metal, for example, aluminum alloy. Further, the roof side-rail's portion in front of the connection with a later-mentioned center pillar 9 is shaped to gently incline downward, providing a front-pillar upper member 1A.

Reference numeral 9 designates a center pillar that forms an up-and-down directional framework member on one side of the vehicle body. The center pillar 9 is formed by a pillar outer member 10 and a pillar inner member 11, providing a closed section.

The pillar outer member 10 is provided, at a top thereof, with a shoulder part 12 of substantial L-shaped cross section, which projects outward and supports the side-rail's corner defined by the lower wall 3 and the outer wall 4.

As shown in FIG. 3, the top end of the shoulder part 12 is welded to the outer wall 4 of the roof side-rail 1. On the other hand, the pillar inner member 11 has its top end welded to the inner wall 5 of the roof side-rail 1.

In FIG. 3, welding parts are respectively shown with letter W.

A plurality of vertical ribs 13 are formed on an inner face of the pillar outer member 10 integrally. These vertical ribs 13 are separated from each other in the fore-and-aft direction of vehicle. Extending from a base 12a of the shoulder part 12 downward, each vertical rib 13 has its upper end abutting on the lower wall 3 of the roof side-rail 1. Further, each vertical rib 13 is formed to project inward in the width direction of the vehicle, up to a position to intersect with the vertical rib 7 of the roof side-rail 1.

Although the pillar outer member 10 of this embodiment is provided with two vertical ribs 13 (see FIG. 4), the modified member 10 may be provided with ribs more than two, of course.

Figure 4:
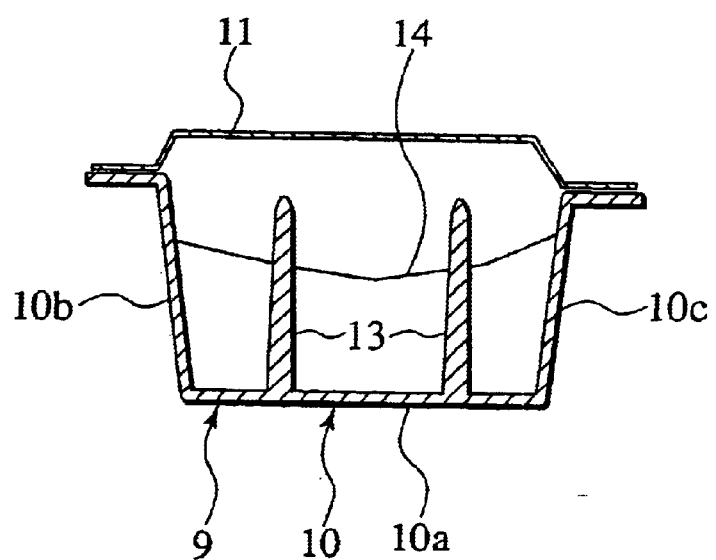
FIG. 4 is a sectional view taken along a line IV—IV of FIG. 3.
Figure 5:
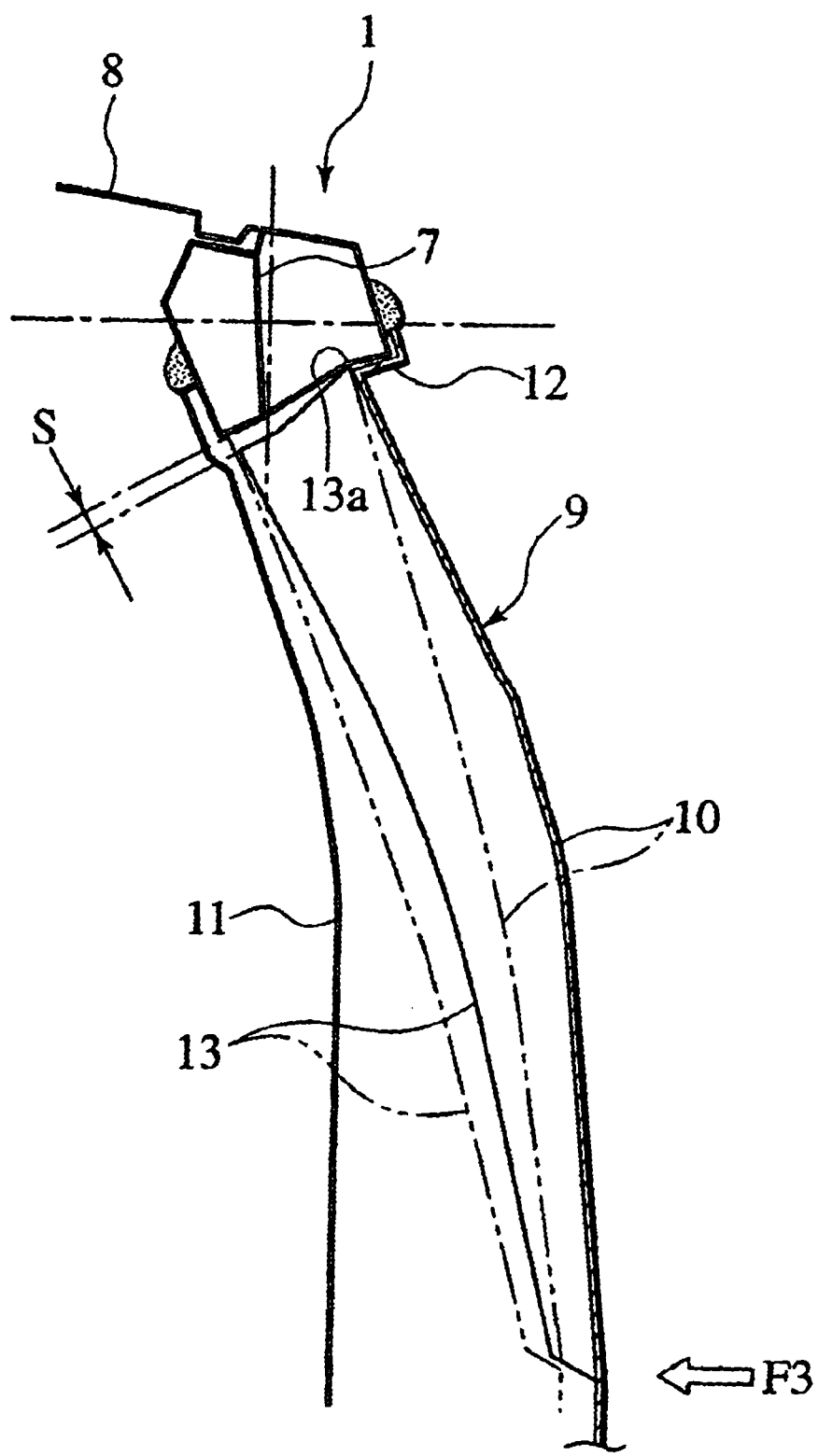
FIG. 5 is a sectional view for explanation of the operation of the body upper structure of the embodiment at the vehicle side collision.

As shown in FIG. 5, each vertical rib 13 is shaped in such a manner that its projecting top gradually approaches an inner face of a side wall 10a (FIG. 4) of the pillar outer member 10 as the projecting top is positioned downward. In other words, the length of the projecting rib 13 is gradually reduced as the vertical position of a rib's part comes down.

As shown in FIGS. 3 and 4, the pillar outer member 10 further includes a transverse rib 14 formed to intersect with the above vertical ribs 13, 13. Inside the pillar outer member 10, the transverse rib 14 is formed to bridge between a front wall 10b and a rear wall 10c of the member 10.

Although the pillar outer member 10 of this embodiment is provided with one transverse rib 14, of course, the modified member 10 may be provided with a plurality of transverse ribs in the up-and-down direction of the vehicle body.

The lower wall 3 of the roof side-rail 1 is provided, in a position corresponding to the base 12a of the shoulder part 12, with a bending part 3a slightly projecting upward. Thus, the lower wall 3 is formed with a shallow V-shaped cross section.

As to the upper end of each vertical rib 13 (in the up-and-down direction of the vehicle body) of the pillar outer member 10, a rib's outer edge in the width direction of the vehicle projects slightly upward from the base 12a of the shoulder part 12 thereby to engage with the bending part 3a of the lower wall 3. Further, the upper end of each vertical rib 13 is shaped so as to gradually separate from the lower wall 3 as being apart from the above-mentioned rib's abutment on the bending part 3a inward in the width direction of vehicle, finally providing a clearance S between the lower wall 3 and the top of the vertical rib 13. Namely, the upper end of each vertical rib 13 is contoured to define a predetermined open angle against the lower wall 3.

According to the embodiment, the vertical rib 7 of the roof side-rail 1 is arranged in a position deviated from a center (of balance) C of the closed section of the roof side-rail 1 inward in the width direction of vehicle (see FIG. 3). In connection, as obviously shown in FIG. 5, each vertical rib 13 of the pillar outer member 10 is arranged close to the pillar inner member 11 so that, in view of the up-and-down direction of vehicle, the upper end of the rib 13 extends from the bending part 3a to at least a position to intersect with the vertical rib 7 of the roof side-rail 1.

In the embodiment, the pillar outer member 10 and the pillar inner member 11 are respectively molded in casting of light metal, such as aluminum alloy. In assembling, these pillar outer/inner members 10, 11 are arranged to abut on each other in the width direction of vehicle and successively welded to each other through their flanges.

In FIGS. 1 and 2, reference numeral 16 designates a front-pillar lower member which is welded to a front end of the front-pillar upper member 1A thereby to form a front pillar 15. The front-pillar lower member 16 is molded in casting of light metal similar to the material for the front-pillar upper member 1A, defining an opened cross section.

In spite of such an opened sectional structure, the front-pillar lower member 16 is laid to overlap with the outside face of a dash side member 18 of a body side structure 17 and successively, the periphery of the member 16 is welded to the member 18, providing a closed sectional assembly.

The body side structure 17 is formed by the dash side member 18, a sill inner member 19B (of a side sill 19) and a pillar inner/lower member 11R (of the center pillar 9), all of which are cast in one body of light metal, such as aluminum alloy.

Further, a sill outer member 19A of the side sill 19 is molded in casing of light metal, as similar to the body side structure 17. In assembling, a lower/front end of the pillar outer member 10 (of the center pillar 9) is welded to a lower/rear end of the front-pillar lower member 16 through the sill outer member 19A. Further, the lower end of the pillar inner member 11 (of the center pillar 9 is welded to the upper end of the pillar inner/lower member 11R. From so-called "sub-assembly" condition as above, the front-pillar lower member 16, the sill outer member 19A and the pillar outer member 10 are brought into abutment with the dash side member 18, the sill inner member 19B and the pillar inner and inner/lower member 11, 11R respectively. Continuously, the former members (16, 19A, 10) are welded to the latter members (18, 19B, 11R, 11) for integration.

In the above-mentioned structure of the embodiment, when the roof side-rail 1 is subjected to a front collision input (impact) F1 or a roof collapse input (impact) F2 as shown in FIG. 2, a downward bending load Fa is generated by a downward bending moment Ma produced in the vicinity of the joint of the side-rail 1 with the center pillar 9. As a result, the roof side-rail 1 has a tendency at its part between the center pillar 9 and the front pillar 15 to deform downward as shown with dashed lines of FIG. 2.

According to the embodiment, however, since the above-mentioned vertical rib 7 in the roof side-rail 1 acts to receive the above bending load Fa in the form of so-called "buckling load" in the up-and-down direction, the roof side-rail 1 as a whole can exhibit a high resistance against the bending load in the up-and-down direction. Additionally, at the joint of the side-rail 1 with the center pillar 9, the above downward load Fa is accepted by the above-mentioned shoulder part 12 of the pillar outer member 10 and also the vertical ribs 13 formed therein, in the axial direction of the center pillar 9. Note that, the vertical ribs 13 are arranged so as to intersect with the vertical rib 7 of the roof side-rail 1.

Then, since the center pillar 9 has an enhanced rigidity in the width direction of the vehicle owing to the provision of the plural vertical ribs 13, the bending deformation in the width direction of vehicle is so restricted that the above load Fa is transmitted in dispersion to the whole center pillar 9 effectively. Then, subsequently to this transmission of this load Fa, it is continuously transmitted in dispersion to the side sill 19 as one framework member in a fore-and-aft direction of vehicle floor.

In this way, according to the invention, it is possible to reduce the degree of local deformation on the roof side-rail.

On the other hand, as shown in FIG. 5, when the center pillar 9 is subjected to an inward collapse load F3 due to the side collision of vehicle, this load F3 is effectively transmitted in dispersion to the roof side-rail 1 through the intermediary of the above shoulder part 12 and the vertical ribs 13 of the pillar outer member 10, in the form of a load apt to thrust up the roof side-rail 1. Again noted, the roof side-rail 1 has an enhanced rigidity for bending owing to the provision of the vertical rib 7. Thus, owing to this effective transmission of the center pillar 9, it is possible to prevent an occurrence of local deformation on the joint between the center pillar 9 and the roof side-rail 1, whereby an inward collapse of the center pillar 9 can be restricted as shown with dash lines of FIG. 5.

Consequently, in all cases that the inputs F1, F2 and F3 are generated, it is possible to prevent the breakage of a door window panel and a front window shield (both not shown in the figures) with such a reduced deformation on the roof side-rail 1 or the center pillar 9 and also possible to ensure a sufficient occupant space in a passenger cabin.

Especially, according to the embodiment, since the vertical ribs 13 in the pillar outer member 10 of the center pillar 9 are supported by the transverse rib 14, the bending of the ribs 13 in the fore-and-aft direction of vehicle can be restricted. Additionally, since the vertical rib 7 of the roof side-rail 1 is arranged inward in the width direction of vehicle, it is possible to enlarge a load-transmission area exhibiting high rigidity at the joint between the roof side-rail 1 and the upper end of the center pillar 9, whereby the load-transmissibility between the roof side-rail 1 and the center pillar 9 can be enhanced furthermore.

Moreover, the roof side-rail 1 and the pillar outer member 10 of the center pillar 9 are respectively formed into one body of light metals by extrusion and casting, respectively. Therefore, it is possible to construct these components as designed with ease, attaining a desired load-transmissibility.

Additionally, the vertical ribs 13 have their top edges upwardly projecting from the base of the shoulder part 12 of the pillar outer member 10. When assembling the roof side-rail 1 to the center pillar, the engagement of the top edges of the ribs 13 with the bending part 3a of the lower wall 3 allows of the positioning between the roof side-rail 1 and the center pillar 9 in the width direction of vehicle. Furthermore, it should be noted that the relationship in assembling the roof side-rail 1 and the center pillar 9 resides in only the above abutment of the top edges of the ribs 13 on the lower wall 3. Thus, when assembling the roof side-rail 1 to the center pillar 9, it is possible to absorb respective dimensional errors of these components in their accuracy, improving the workability in assembling.

Again, owing to the relationship between the roof side-rail 1 and the center pillar 9 by only the abutment of the top edges of the ribs 13 in the pillar outer member 10 on the lower wall 3 of the roof side-rail 1, it is possible to avoid an occurrence of frictional noise due to the bending or torsion on the roof side-rail 1 and the center pillar 9 during the vehicle's traveling.

Figure 6:
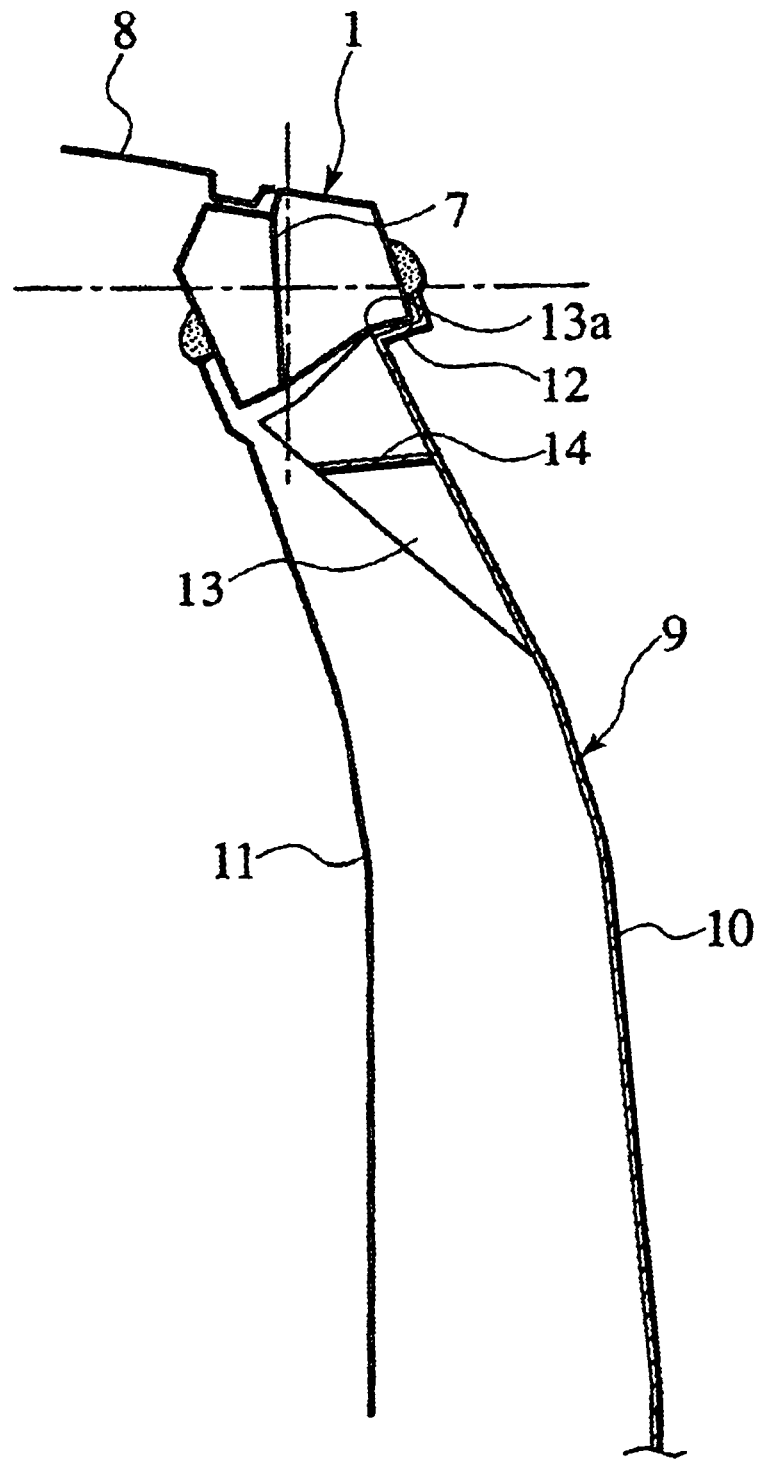
FIG. 6 is a sectional view of the body upper structure of the second embodiment, similar to FIG. 5.

FIG. 6 shows another embodiment of the pillar outer member forming the center pillar. Note, in this embodiment, elements similar to those of the previous embodiment are indicated with the same reference numerals and their overlapping descriptions are eliminated.

According to this embodiment, the pillar outer member 10 is provided with the vertical ribs 13 whose vertical lengths in the longitudinal (vertical) direction are shorter than those of the vertical ribs 13 shown in FIG. 5. In detail, the vertical ribs 13 of the pillar outer member 10 are formed with vertical lengths each shorter than a half of the whole vertical length of the pillar outer member 10. As a reference, it is noted that the vertical ribs 13 of the previous embodiment are formed to extend downward in excess of a half of the whole vertical length of the pillar outer member 10.

According to this embodiment, with the above-mentioned formation of the vertical walls 13, it allows an arrangement space for in-pillar components (not shown), such as a seat-belt anchor, to be ensured more effectively.

Operations and effects of the other elements are similar to those of the previously-mentioned embodiment.

Finally, it will be understood by those skilled in the art that the foregoing descriptions are nothing but two embodiments of the disclosed body upper structure for vehicle. Besides these embodiments, various changes and modifications may be made to the present invention without departing from the spirit and scope of the invention.

The scope of the invention is defined with reference to the following claims.

What is claimed is:

1. A body upper structure for a vehicle, comprising:
   a roof side-rail which is formed to have a closed cross section and also provided with a vertical rib bridging between an upper wall and a lower wall both forming the roof side-rail; and
   a center pillar united with the roof side-rail, the center pillar having a pillar outer member and a shoulder part formed on an upper end of the pillar outer member so as to fit a successive corner defined between the lower wall and an outer wall forming the roof side-rail thereby to support the roof side-rail;
   wherein the pillar outer member is provided, on an interior side thereof with a plurality of vertical ribs at an interval in a fore-and-aft direction of the vehicle, the vertical ribs extending from a base of the shoulder part downward while respective upper ends of the vertical ribs are abutting on the lower wall of the roof side-rail; and
   wherein the vertical ribs are formed to project inwardly in a width direction of the vehicle, up to a position where, in a vertical direction of the vehicle, the upper ends of the vertical ribs substantially overlap and align with the vertical rib of the roof side-rail.

2. The body upper structure as claimed in claim 1, wherein the pillar outer member is provided, on the interior side thereof, with a transverse rib which intersects with the vertical ribs of the pillar outer member.

3. The body upper structure as claimed in claim 1, wherein the vertical rib of the roof side-rail is arranged in a position deviated from a center of the closed cross section inward in the width direction of the vehicle.

4. The body upper structure as claimed in claim 1, wherein the lower wall of the roof side-rail is provided with a bending part which projects upward at a position corresponding to the base of the shoulder part of the pillar outer member.

5. The body upper structure as claimed in claim 4, wherein the upper ends of the vertical ribs of the pillar outer member are shaped in a manner that outer edges in the width direction of vehicle project from the base of the shoulder part slightly upward thereby to engage with the bending part of the lower wall of the roof side-rail and further, the upper ends of the vertical ribs are shaped so as to be gradually apart from the lower wall of the roof side-rail toward an inside of the body upper structure in the width direction of the vehicle so that a predetermined opened angle is formed as the upper ends of the vertical ribs come into abutment with the bending part.

6. The body upper structure as claimed in claim 1, wherein the roof side-rail is formed by an integrated extrusion of light metal, while the pillar outer member is formed by an integrated casting of light metal.

7. The body upper structure as claimed in claim 1, wherein the vertical ribs of the pillar outer member are formed with vertical lengths each shorter than a half of the whole vertical length of the pillar outer member.

8. The body upper structure as claimed in claim 1, wherein a top end of the shoulder part of the pillar outer member is welded to the outer wall of the roof side-rail.

* * * * *